June 24, 1930.  C. R. BUCHET  1,767,507
PNEUMATICALLY OPERATED GREASING APPARATUS
Filed Oct. 28, 1927  2 Sheets-Sheet 1
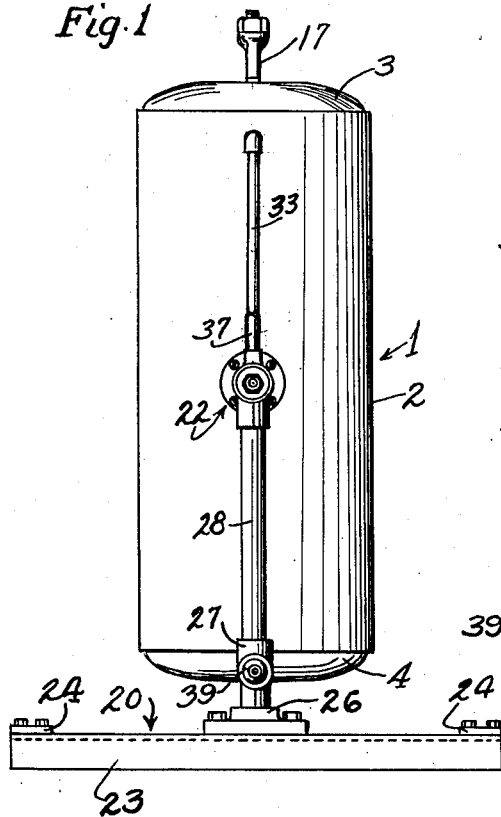
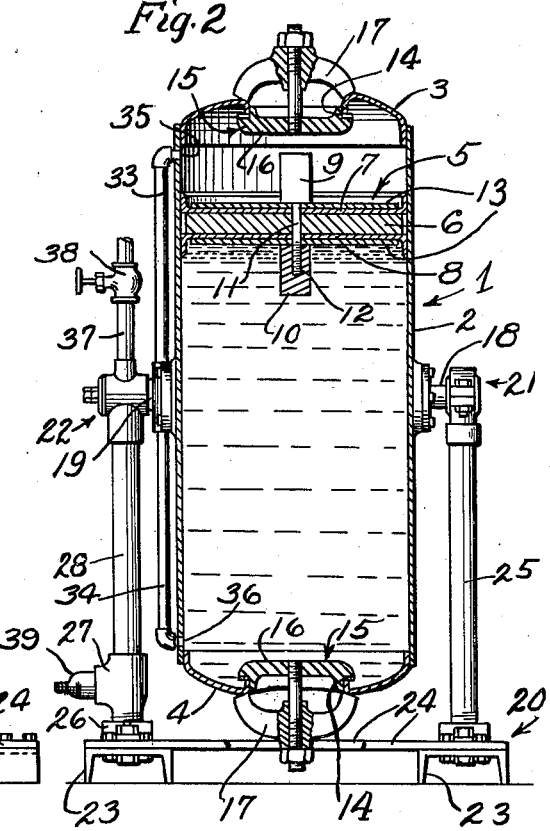
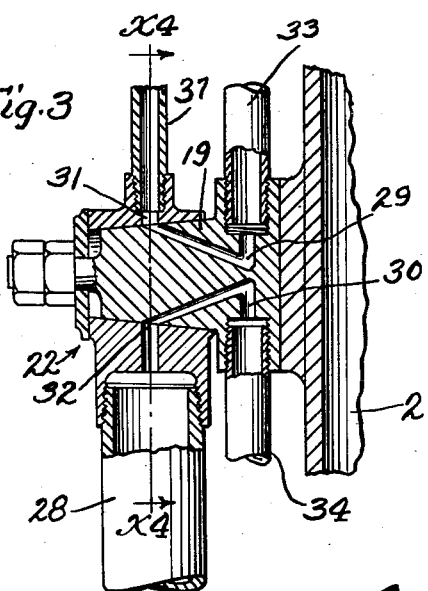
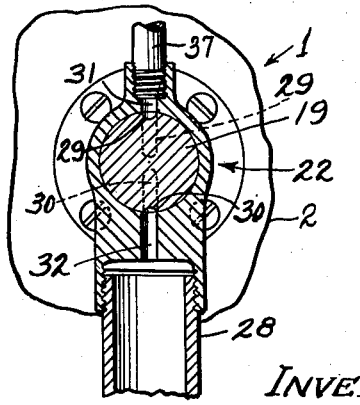

June 24, 1930.　　　C. R. BUCHET　　　1,767,507
PNEUMATICALLY OPERATED GREASING APPARATUS
Filed Oct. 28, 1927　　　2 Sheets-Sheet 2

WITNESS
Robt S. Woolsey

INVENTOR
CONRAD R. BUCHET
by
James R. Townsend
his atty.

Patented June 24, 1930

1,767,507

UNITED STATES PATENT OFFICE

CONRAD R. BUCHET, OF LONG BEACH, CALIFORNIA, ASSIGNOR, BY DIRECT AND MESNE ASSIGNMENTS, TO ALEMITE CORPORATION, OF CHICAGO, ILLINOIS, A CORPORATION OF DELAWARE

PNEUMATICALLY-OPERATED GREASING APPARATUS

Application filed October 28, 1927. Serial No. 229,353.

The structure of this invention has been devised for delivering lubricants to machine bearings and more particularly to the delivery of heavy greases, under high pressure, to grease cups at the lubricating points on automobiles, and is related to the type of apparatus for this purpose, involving a storage tank from which grease is expelled by action of an air driven free piston.

It is among the objects of my invention to provide an improved lubricant container and support therefor, to provide improved valve means for automatically reversing the connections to the container upon the reversal of the container, and generally, to provide simple, efficient, and easily operable means to supply lubricant under pressure.

When the lubricant container of my invention is utilized in combination with a lubricant compressor "booster" the combination provides a highly advantageous apparatus for forcing lubricant under high pressure into bearings to be lubricated. The apparatus may be economically manufactured, is rugged and durable in construction, reliable in operation, and requires the minimum of attention and effort on the part of the attendant.

Other objects, advantages and features of invention may appear from the accompanying drawings, the subjoined detailed description and the appended claims.

The accompanying drawings illustrate the invention.

Figure 1 is a side elevation of the grease tank and mounting therefor constructed in accordance with my invention.

Fig. 2 is a sectional end elevation of the tank and mounting.

Fig. 3 is an enlarged sectional detail elevation of the control valve for the air and grease lines of the tank.

Fig. 4 is a transverse sectional elevation on line x4, Fig. 3.

Figure 5:
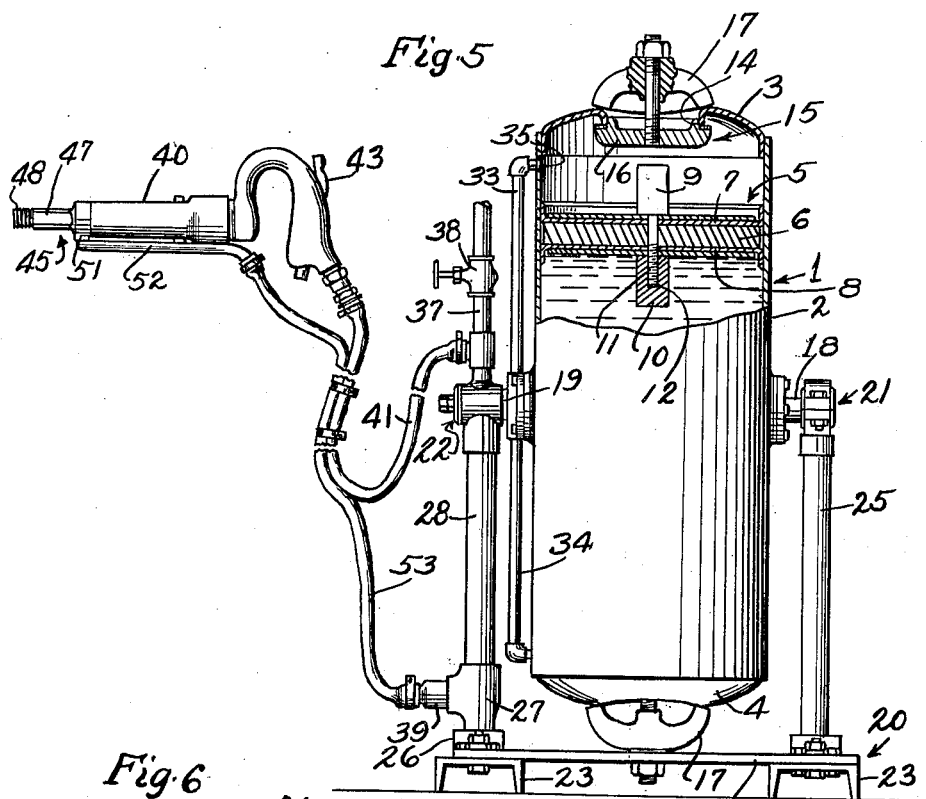
Fig. 5 is an end elevation partly in section of an invertible grease tank having a pneumatically actuated grease delivery connected therewith.
Figure 6:
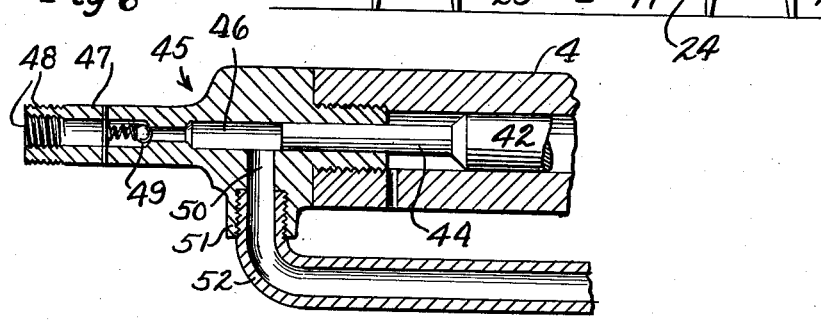
Fig. 6 is a longitudinal sectional elevation showing fragments of the cylinder and piston of a pneumatic tool and the fixture of my invention for connection with the tool to deliver grease at a high pressure.

1 designates the tank, or storage receptacle for grease, which I prefer, and is shown, to comprise a metallic cylinder 2, having heads 3 and 4, which are permanently fixed as by welding. Mounted within the cylinder, and of course, prior to the fixing of the heads, is a piston 5 which consists of a disc-shaped body 6, opposed cup washers 7 and 8 and motion limiting means in the form of studs 9 and 10 for extension above and below the piston body. As shown, the one stud is provided with a threaded stem 11 for extension through the piston body and the other stud is provided with a threaded seat 12 to receive the threaded stem.

Over each of the cup washers is a clamping disc 13 through which the stem 11 is extended so that the studs serve the double purpose of limiting the motion of the piston and securing the several parts of the piston.

Filling openings, or hand holes, 14 are formed in each of the tank heads and closures 15, comprising plates 16 and clamps 17 are provided for the ready opening and closing of the filling openings in a manner to provide for tight, non-leaking joints.

For facile bodily inversion of the tank there are trunnions 18 and 19 which are secured to the tank to project from diametrically opposite points at approximately the vertical center of the tank. A carriage, or base, 20 having bearings 21 and 22 for the trunnions provides a mounting for the tank. The base shown consists of a pair of channel irons 23 and a pair of metal bars 24 crossing the channel irons to form therewith a substantially rectangular frame. Arising from one of the channel irons is a standard 25 carrying at its upper end the bearing 21 which may be of any conventional construction to receive the trunnion 18.

Secured to the channel iron opposite the one carrying the standard 25 is a fitting 26 and threaded into the fitting is a T-coupling 27. Secured in the T-coupling is a pipe 28 which serves as a standard and carried at the upper end of the pipe 28 is the recited bearing 22, which is so constructed as to constitute a valve casing as well as to journal the trunnion 19. As shown in Fig. 3 the trunnion 19 is of conical form, whereby it may best serve as a valve element and has formed therein diametrically opposed ducts 29 and 30, the outer ends of which are for communication respectively with ports 31 and 32 in the bearing-casing 22 and the inner ends of which communicate with pipes 33 and 34, respectively, which are secured in the body of the trunnion and which extend to and are secured at the opposite ends of the tank and open to the interior thereof as at 35 and 36. Connected with the bearing-casing for communication with the port 31 is a pipe 37, having a cut-off valve 38 which extends to and communicates with a source of air supply, under pressure, not shown.

Secured in the lateral branch of the T-coupling 27 is a reducer nipple 39 for connection with a grease dispenser which may consist of the ordinary nozzle and hose.

An example of the use of the tank is as follows: Assuming the tank to be filled with grease; the piston at the upper end of the tank; the valve 38 open to admit and build up an operating air pressure in the tank above the piston and the delivery nozzle open, it will be obvious that air will flow through pipe 37, port 31, duct 29 and pipe 33 to the tank above the piston and as the piston is lowered by the air pressure, grease will take a course through pipe 34, duct 30, port 32, pipe 28, T-coupling 27 and reducer nipple to the delivery nozzle, until such time as when the piston is stopped in its descent by stop 10. To refill the empty tank, the air valve 38 and delivery nozzle are both closed; the closure 15 at the top of the tank removed and the tank, with the piston at the bottom filled with grease, the closure replaced and the tank bodily upset as by a simple rotation upon its trunnions. This rotation of the tank brings the piston to the top of the tank, and reverses the rotary valve; that is to say it brings the pipe 34, which was the grease pipe, to communication with the source of air supply through duct 29, port 31 and pipe 37 and concurrently brings the pipe 33, which was the air pipe to communication with the grease delivery means through duct 30, port 32, pipe 28, T-coupling 27 and reducer nipple 39. The air valve 38 is then reopened and the operation is repeated as described.

Ordinarily grease from storage tanks is delivered to and forced into the cups, bearings or other points for lubrication at a tank pressure which is relatively low and as a consequence, the operation is slow and because of such pressure the delivered grease has low penetrating force.

To increase the pressure of the grease at the delivery nozzle whereby the flow rate of the grease is heightened to the end that a greater number of greasing operations may be accomplished in a given time and to provide for higher penetration in the delivered grease whereby points for lubrication which could not heretofore be reached are now thoroughly lubricated, I employ the storage tank only as a supply to a high pressure delivery mechanism which acts to build up the pressure at the delivery nozzle.

For this purpose I employ an ordinary pneumatic tool as commonly employed for hammering, cutting and similar purposes such as shown at 40 in Fig. 5, the air line 41 of which is connected with the pipe 37 for delivering air to the storage tank and the action of the piston 42 is controlled as common by manipulation of the control valve 43.

Carried by the piston is a reduced forwardly projecting cylindrical stem 44 which serves as a plunger in the building up of the pressure in the delivered grease. To the forward end of the cylinder, or body of the tool there is secured as by threading a fitting 45 having a bore 46, to receive the plunger, the length of which bore equals the stroke of the piston. The fitting further includes a tubular snout 47, preferably formed as an integral part of the fitting and is provided with means such as the threads 48 for connection with a hose or other delivery device, not shown, and such snout further includes a check valve 49 comprising an extensible coil spring of relatively high tension so that it may serve to hold the valve normally closed against the pressure of the grease from the tank.

Intersecting the bore 46 is a grease intake bore 50 surrounding which is a threaded nipple 51 to which grease supply pipe 52 is secured and which pipe is for connection with the reducer nipple 39 of the tank as by a flexible tube 53.

While I have referred to the pneumatic tool as ordinary, I prefer to employ a tool of the high speed type which will operate from tank pressures at about one hundred and fifty pounds and at speeds up to about six thousand strokes per minute. At such speeds there may be built up at the delivery nozzle a pressure of approximately five thousand pounds.

Heretofore pressures at the delivery nozzle were substantially the same as the tank pressures, which were obviously low, and by which the grease was only "pushed" into the greasing point, but by the use of a high speed pneumatic hammer the grease is driven by impact, with the result that there is maximum penetration of grease by reason of built up pressure or "boosting" in the hammer and maximum safety and operation economy by reason of a relatively low pressure in the tank supplying fluid motive power for the operation of the hammer.

I claim:

1. A greasing apparatus comprising a tank; a piston within the tank; a filling opening at each end of the tank; a mounting providing bodily inversion of the tank; means operable by inversion of the tank for interchangeably admitting fluid pressure to the tank at one end of the tank and delivering grease from the other end of the tank; and vice versa.

2. In a greasing apparatus, a tank; a piston within the tank; a filling opening at each end of the tank; a support for the tank comprising bearings and trunnions on the tank and forming a rotary valve operable by a bodily inversion of the tank; and means operable by inversion of the tank for placing the valve in communication alternately with opposite ends of the tank, whereby upon an inversion of the tank said valve automatically controls the grease delivery and the admission of a piston operating fluid.

3. In a greasing apparatus, a carriage comprising bearings; a tank having trunnions for rotation in said bearings; one of said bearings formed as a valve casing and one of said trunnions formed as a plug valve; pipes connected with said valve casing for the delivery of air to the valve and for the discharge of grease from the valve; and a pipe leading from each side of the plug valve to each end of the tank; and a piston in said tank, said last mentioned pipes serving interchangeably by rotation of the plug valve to admit air to the tank for the operation of the piston and to deliver grease from the tank.

4. Lubricating apparatus of the class described, comprising a support, an invertible tank pivotally mounted on said support, a movable wall extending across said tank, an inlet and an outlet connection carried on said support, means to connect said inlet and outlet respectively to opposite sides of said tank, and means operable upon inverting said tank to reverse said connecting means.

5. In lubricating apparatus of the class described, the combination of a lubricant tank, a movable wall therein, means for supporting said tank for pivotal movement, means for connecting a source of air under pressure to said tank at one side of said movable wall, means for connecting a lubricant discharge line to said tank at the other side of said movable wall, and means for reversing said connections upon pivotal movement of said tank.

6. In lubricating apparatus of the class described, the combination of a lubricant tank, a piston reciprocable therein, filling openings in the ends of said tank, means for supporting said tank to permit its inversion, conduit means for discharging lubricant from said tank, conduit means for admitting air under pressure to said tank, and means for reversing the connections of said conduit means to said tank upon inversion thereof.

7. In lubricating apparatus of the class described, the combination of a cylindrical tank, a sliding separator reciprocable therein, filling openings in the ends of said tank, means for pivotally supporting said tank to permit inversion thereof, said means including a bearing having a lubricant discharge passageway on one side thereof and a compressed air admission passageway on the other side thereof, a valve member journaled in said bearing and having ducts adapted to communicate with said air admission passageway or said lubricant discharge passageway, and conduits connecting said ducts with the respective ends of said tank.

In testimony whereof, I have hereunto set my hand at Los Angeles, California, this 21st day of October, 1927.

CONRAD R. BUCHET.